US012810088B2

(12) United States Patent
Huang

(10) Patent No.: US 12,810,088 B2
(45) Date of Patent: Nov. 24, 2026

(54) BARCODE SCANNER AND METHOD OF OPERATING THE SAME

(71) Applicant: Getac Technology Corporation, New Taipei City (TW)

(72) Inventor: Cheng-Liang Huang, Taipei City (TW)

(73) Assignee: Getac Technology Corporation, New Taipei City (TW)

( * ) Notice: Subject to any disclaimer, the term of this patent is extended or adjusted under 35 U.S.C. 154(b) by 0 days.

(21) Appl. No.: 19/240,338

(22) Filed: Jun. 17, 2025

(65) Prior Publication Data

US 2026/0093941 A1 Apr. 2, 2026

(30) Foreign Application Priority Data

Sep. 30, 2024 (CN) ......................... 202411378656.7

(51) Int. Cl.
*G06K 7/10* (2006.01)

(52) U.S. Cl.
CPC ...... *G06K 7/10811* (2013.01); *G06K 7/10722* (2013.01); *G06K 7/10881* (2013.01)

(58) Field of Classification Search
None
See application file for complete search history.

(56) References Cited

U.S. PATENT DOCUMENTS

| | | | |
|---|---|---|---|
| 6,561,426 | B1 | 5/2003 | Blanford et al. |
| 9,589,165 | B2 | 3/2017 | Reynolds et al. |
| 2015/0001304 | A1 | 1/2015 | Todeschini |

FOREIGN PATENT DOCUMENTS

| | | | | |
|---|---|---|---|---|
| CN | 113546850 | A | 10/2021 | |
| CN | 113919382 | B * | 4/2023 | ............. G06K 7/146 |
| CN | 116709017 | A | 9/2023 | |
| CN | 117422083 | A | 1/2024 | |
| TW | M659978 | U | 9/2024 | |

* cited by examiner

*Primary Examiner* — Kristy A Haupt
(74) *Attorney, Agent, or Firm* — Cooper Legal Group, LLC

(57) ABSTRACT

A method of operating a barcode scanner includes: capturing an image by an image capturing device, the image including a barcode, and the image capturing device having a first focal length, wherein the image capturing device is configured to auto-focus on the image; adjusting the first focal length of the image capturing device to a second focal length different from the first focal length; scanning the barcode in the image; and fixing the second focal length until a time interval is exceeded.

20 Claims, 10 Drawing Sheets

BARCODE SCANNER AND METHOD OF OPERATING THE SAME

CROSS-REFERENCE TO RELATED APPLICATION

This application claims priority to China Application Serial Number 202411378656.7, filed Sep. 30, 2024, which is herein incorporated by reference in its entirety.

BACKGROUND

Field of Disclosure

The present disclosure relates to a barcode scanner and a method of operating the same.

Description of Related Art

A professional two-dimensional barcode scanner utilizes technologies such as cameras, LEDs, and laser beams to scan barcodes. In general, the aforementioned cameras are fixed-focus cameras with specific focal lengths and varying fields of view (FoV), capable of adapting to barcodes of different sizes and distances. However, using only one barcode camera cannot satisfy all use scenarios. With technological advancements, current tablet computers and mobile phones are equipped with auto-focus cameras designed for capturing photos and videos, which are now also frequently used for scanning barcodes.

However, an auto-focus camera must perform a focusing operation for each object, and its scanning speed is relatively slow. For example, an auto-focus camera may require approximately 500 milliseconds to 1 second, or even longer, to complete the scanning of a single object. In contrast, a fixed-focus camera has a predetermined focal length and is suitable for consistent and unchanging scanning conditions. Comparatively, an auto-focus camera provides greater flexibility and adaptability, making it suitable for various use scenarios. Nonetheless, the scanning speed of an auto-focus camera is generally slower than that of a fixed-focus camera because the auto-focus camera needs time to adjust the focal length for each object to be scanned.

Therefore, how to propose a barcode scanner and a method of operating the same that can improve the aforementioned problem is one of the problems that the industry urgently keen to invest in research and development resources to solve.

SUMMARY

In view of this, one purpose of the present disclosure is to provide a barcode scanner and a method of operating the same that can solve the aforementioned problems.

In order to achieve the above objective, in accordance with an embodiment of the present disclosure, a method of operating a barcode scanner includes: capturing an image by an image capturing device, the image including a barcode, and the image capturing device having a first focal length, in which the image capturing device is configured to auto-focus on the image; adjusting the first focal length of the image capturing device to a second focal length different from the first focal length; scanning the barcode in the image; and fixing the second focal length until a time interval is exceeded.

In one or more embodiments of the present disclosure, the method of operating the barcode scanner further includes: locking a focusing device of the barcode scanner within the time interval after the image capturing device auto-focuses on the image.

In one or more embodiments of the present disclosure, the method of operating the barcode scanner further includes: displaying an icon of a focusing device configured to lock the barcode scanner on a user interface of the barcode scanner after the image capturing device auto-focuses on the image.

In one or more embodiments of the present disclosure, the method of operating the barcode scanner further includes: controlling the image capturing device to auto-refocus the image after the time interval is exceeded.

In one or more embodiments of the present disclosure, the method of operating the barcode scanner further includes: capturing a second image comprising a second barcode different from the barcode by the image capturing device, in which the image capturing device has the second focal length; and scanning the second barcode in the second image.

In one or more embodiments of the present disclosure, scanning the second barcode in the second image includes scanning the second barcode in the second image by the image capturing device having the second focal length within the time interval.

In one or more embodiments of the present disclosure, scanning the barcode in the image is performed by the barcode scanner having the second focal length.

In order to achieve the above objective, in accordance with an embodiment of the present disclosure, a method of operating a barcode scanner includes: capturing an image by an image capturing device, the image including a barcode, and the image capturing device having a first focal length; adjusting the first focal length of the image capturing device to a second focal length different from the first focal length; scanning the barcode in the image; fixing the second focal length until a time interval is exceeded; and displaying a countdown dynamic message on a user interface of the barcode scanner, and the countdown dynamic message being displayed with the time interval.

In one or more embodiments of the present disclosure, the method of operating the barcode scanner further includes: locking a focusing device of the barcode scanner within the time interval after adjusting the first focal length of the image capturing device to the second focal length.

In one or more embodiments of the present disclosure, the method of operating the barcode scanner further includes: displaying an icon of a focusing device configured to lock the barcode scanner on the user interface of the barcode scanner after adjusting the first focal length of the image capturing device to the second focal length.

In one or more embodiments of the present disclosure, the method of operating the barcode scanner further includes: controlling the image capturing device to auto-refocus the image after the time interval is exceeded.

In one or more embodiments of the present disclosure, the method of operating the barcode scanner further includes: capturing a second image including a second barcode different from the barcode by the image capturing device, in which the image capturing device has the second focal length; and scanning the second barcode in the second image.

In one or more embodiments of the present disclosure, scanning the second barcode in the second image includes scanning the second barcode in the second image by the image capturing device having the second focal length within the time interval.

In one or more embodiments of the present disclosure, scanning the barcode in the image is performed by the barcode scanner having the second focal length.

In order to achieve the above objective, in accordance with an embodiment of the present disclosure, a barcode scanner includes an image capturing device, a scanning module, a focusing device, a timer module, and a processor. The image capturing device is configured to capture an image. The scanning module is configured to scan a plurality of barcodes in the image. The focusing device is configured to adjust the image capturing device to have a first focal length and a second focal length different from the first focal length. The timer module is configured to set a time interval after the scanning module scans one of the plurality of barcodes. The processor is electrically or communicatively connected to the image capturing device, the scanning module, the focusing device, and the timer module. The processor is configured to: control the focusing device to adjust the first focal length of the image capturing device to the second focal length; control the scanning module to scan the one of the plurality of barcodes as the image capturing device has the second focal length; and control the focusing device to fix the second focal length until the time interval is exceeded after the scanning module scans the one of the plurality of barcodes.

In one or more embodiments of the present disclosure, the processor is further configured to: control the image capturing device to auto-refocus the image after the time interval is exceeded.

In one or more embodiments of the present disclosure, the processor is further configured to: control the image capturing device to capture a second image including a second one of the plurality of barcodes, and the image capturing device having the second focal length.

In one or more embodiments of the present disclosure, the processor is further configured to: lock the focusing device within the time interval after the focusing device adjusts the first focal length of the image capturing device to the second focal length.

In one or more embodiments of the present disclosure, the processor is further configured to: display an icon of the focusing device configured to lock the barcode scanner on a user interface of the barcode scanner after the focusing device adjusts the first focal length of the image capturing device to the second focal length.

In one or more embodiments of the present disclosure, the focusing device is locked by a touching signal of a user triggering the icon.

In summary, in the barcode scanner and the method of operating the same of the present disclosure, since the focusing device can adjust the focal length of the image capturing device to the first focal length or the second focal length, the user can hold the barcode scanner and perform auto-focus on different barcodes located at different distances. In the barcode scanner and the method of operating the same of the present disclosure, since the focusing device can perform auto-focus on a barcode and the focusing device can be controlled by the processor to fix the focal length of the image capturing device, the user can hold the barcode scanner and perform continuous scanning of different barcodes located at the same distance. In the barcode scanner and the method of operating the same of the present disclosure, since the timer module can set a time interval after the scanning module scans a barcode, and the processor can control the focusing device to fix the focal length of the image capturing device until the time interval is exceeded, the user can perform continuous scanning of different barcodes located at the same distance within the time interval, thereby saving the time otherwise required for the focusing device to focus on each individual barcode. In the barcode scanner and the method of operating the same of the present disclosure, since the processor controls the image capturing device to auto-refocus the image after the time interval is exceeded, the service life of the focusing device can be extended. Overall, the operating method of the barcode scanner of the present disclosure saves the time required by the focusing device to focus on different barcodes.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
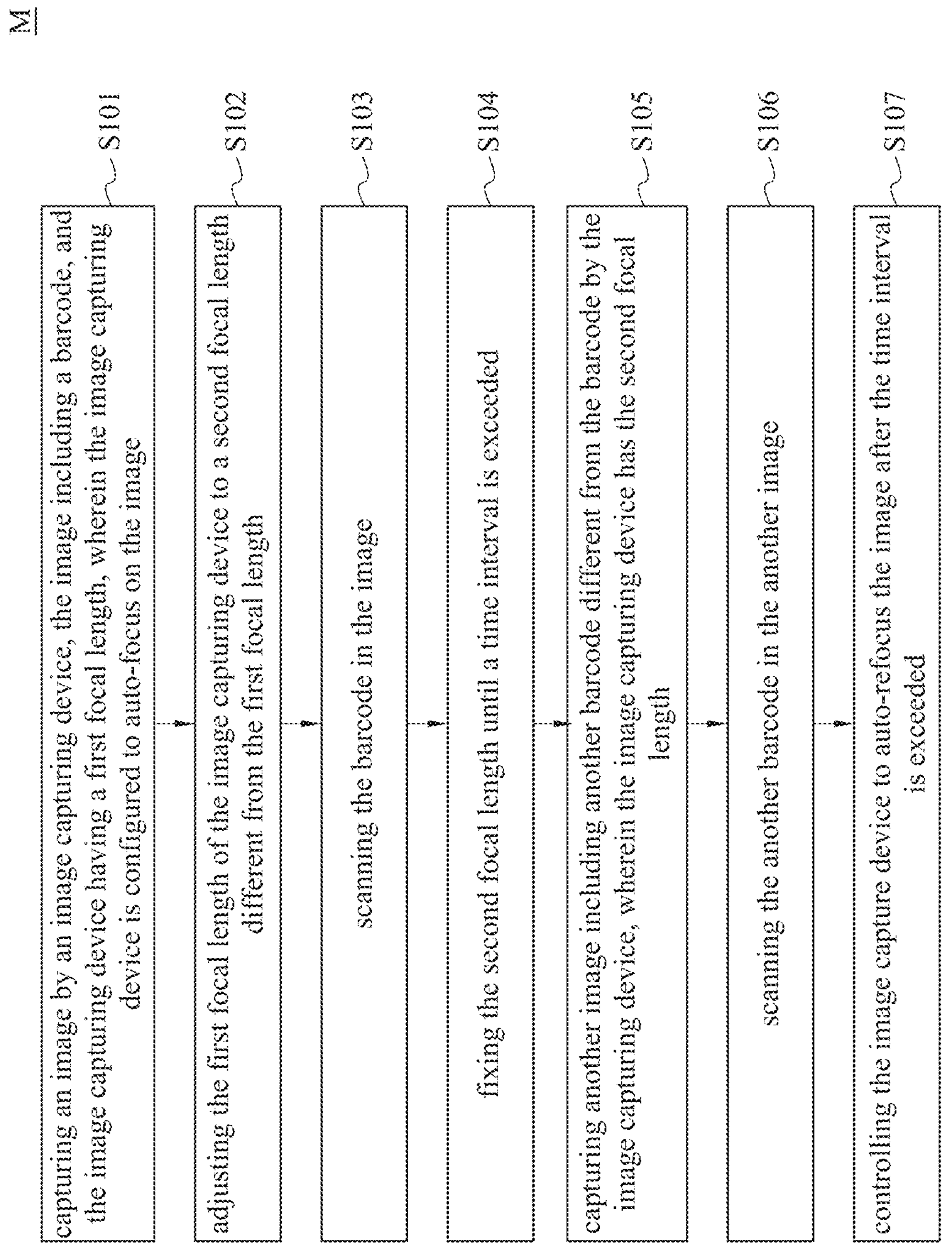
FIG. 1 is a flow chart of a method of operating a barcode scanner in accordance with an embodiment of the present disclosure.

The following disclosure provides various different embodiments or implementations for achieving the disclosed subject matter. Specific embodiments of components and configurations are described below to simplify the present disclosure. Of course, these are merely exemplary embodiments and are not intended to be limiting. For example, in the following description, a first feature formed "on" a second feature or "over" a second feature may include embodiments in which the first and second features are in direct contact, as well as embodiments in which additional features are formed between the first and second features such that the first and second features are not in direct contact. In addition, reference numerals and/or letters may be repeated throughout the present disclosure in various embodiments. Such repetition is for the sake of simplicity and clarity and does not in itself dictate a relationship between the various embodiments and/or configurations discussed.

Furthermore, for ease of description, spatially relative terms such as "below," "beneath," "under," "above," "over," and the like may be used to describe the relationship between one feature or element and another feature or element as illustrated in the figures. In addition to the orientations depicted in the figures, the spatially relative terms are intended to encompass different orientations of the device in use or operation. The device may be positioned in other orientations (rotated 90 degrees or in other directions), and the spatially relative terms used herein are to be interpreted accordingly.

As used herein, the terms "about," "approximately," "substantially," or the like generally refer to within 20%, 10%, or 5% of a given value or range. Numerical values provided herein are to be understood as approximations unless explicitly stated otherwise, and such approximations may be inferred through the use of the terms "about," "approximately," "substantially," or similar expressions.

Reference is made to FIG. 1. FIG. 1 is a flow chart of a method M of operating a barcode scanner 100 in accordance with an embodiment of the present disclosure. As shown in FIG. 1, the method M includes step S101, step S102, step S103, step S104, step S105, step S106, and step S107. For a better understanding of step S101, reference is made to FIG. 1, FIG. 2, FIG. 3, FIG. 4, and FIG. 5A. For a better understanding of step S102, reference is made to FIG. 1, FIG. 2, FIG. 3, and FIG. 5B. For a better understanding of step S103, reference is made to FIG. 1, FIG. 2, FIG. 3, and FIG. 6. For a better understanding of step S104, reference is made to FIG. 1, FIG. 2, FIG. 3, FIG. 7A, and FIG. 7B. For a better understanding of step S105, reference is made to FIG. 1, FIG. 2, FIG. 3, and FIG. 8. For a better understanding of step S106, reference is made to FIG. 1, FIG. 2, FIG. 3, and FIG. 9. For a better understanding of step S107, reference is made to FIG. 1, FIG. 2, FIG. 3, and FIG. 10.

Figure 2:
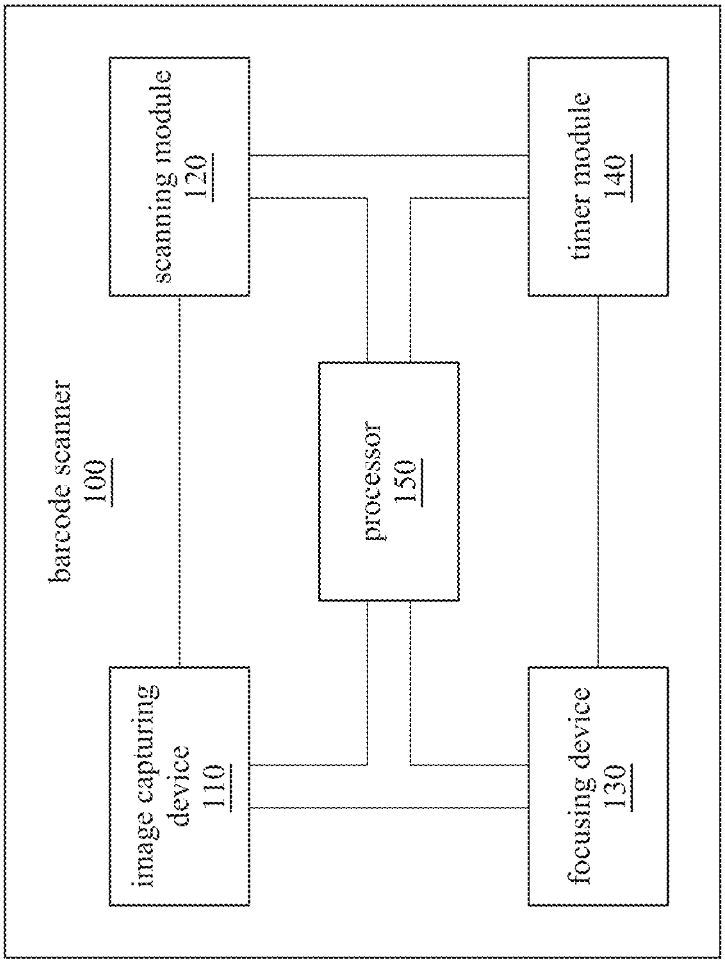
FIG. 2 is a functional block diagram of a barcode scanner in accordance with an embodiment of the present disclosure.

Reference is made to FIG. 2. FIG. 2 is a functional block diagram of a barcode scanner 100 in accordance with an embodiment of the present disclosure. As shown in FIG. 2, in this embodiment, the barcode scanner 100 includes an image capturing device 110, a scanning module 120, a focusing device 130, a timer module 140, and a processor 150. The image capturing device 110 is connected to the scanning module 120, the focusing device 130, and the processor 150. The image capturing device 110 is configured to capture images and perform auto-focus on the images. The scanning module 120 is connected to the image capturing device 110, the timer module 140, and the processor 150. The scanning module 120 is configured to scan a plurality of barcodes in the image. The focusing device 130 is connected to the image capturing device 110, the timer module 140, and the processor 150. The focusing device 130 is configured to adjust a focal length of the image capturing device 110. The focusing device 130 is further configured to activate an alarm. The timer module 140 is connected to the scanning module 120, the focusing device 130, and the processor 150. The timer module 140 is configured to set a time interval. Specifically, the timer module 140 has a timing function. The processor 150 is electrically or communicatively connected to the image capturing device 110, the scanning module 120, the focusing device 130, and the timer module 140. The processor 150 is configured to control the image capturing device 110 to capture an image including a barcode. The processor 150 is further configured to control the focusing device 130 to adjust the focal length of the image capturing device 110. The processor 150 is further configured to control the scanning module 120 to scan the barcode. The processor 150 is further configured to control the focusing device 130 to fix the focal length until the time interval is exceeded. The processor 150 is further configured to display an icon on a user interface of the barcode scanner 100. The icon is configured to lock the focusing device 130.

In some embodiments, the barcode scanner 100 may be a smart phone, a tablet, or any other suitable electronic device. The present disclosure is not intended to be limited to the type of the barcode scanner 100.

In some embodiments, the image capturing device 110 may be a camera or any suitable image capturing device configured to capture images. The present disclosure is not intended to be limited to the type of the image capturing device 110.

In some embodiments, the scanning module 120 may include a scanning device utilizing a light-emitting diode (LED), a laser beam, or any other suitable scanning device. The present disclosure is not intended to be limited to the type of the scanning module 120.

In some embodiments, the focusing device 130 may include a voice coil motor or other similar actuators. The present disclosure is not intended to be limited to the type of the focusing device 130.

Figure 3:
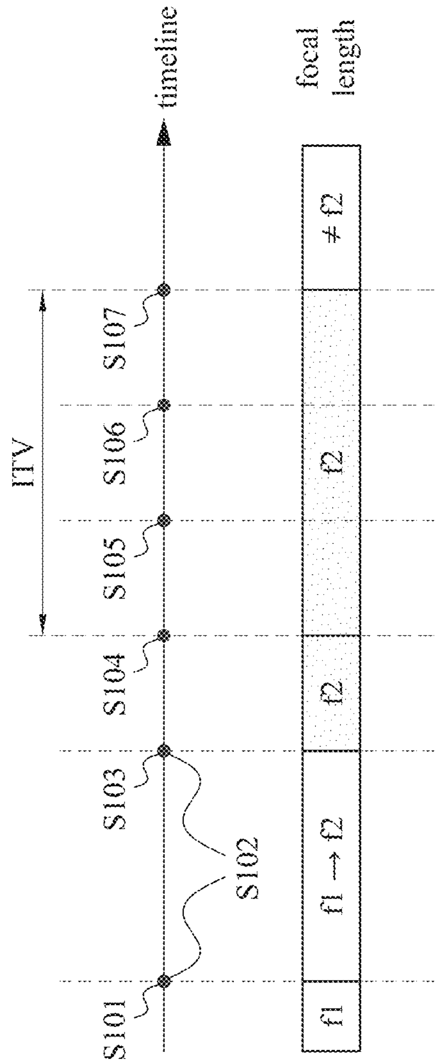
FIG. 3 is a schematic view of the steps and focal length variation of the method of FIG. 1 in accordance with an embodiment of the present disclosure.

Reference is made to FIG. 3. FIG. 3 is a schematic view of the steps and focal length variation of the method M of FIG. 1 in accordance with an embodiment of the present disclosure. FIG. 3 represents step S101, step S102, step S103, step S104, step S105, step S106, and step S107 along a timeline and focal length (i.e., the focal length of the image capturing device 110). In this embodiment, step S101, step S102, step S103, step S104, step S105, step S106, and step S107 are performed sequentially. A time interval ITV is set by the timer module 140. In some embodiments, the time interval ITV begins at step S104 and ends at step S107. As shown in FIG. 3, when performing step S101, the image capturing device 110 has a first focal length f1. When performing step S102, the focal length of the image capturing device 110 is adjusted from the first focal length f1 to a second focal length f2. When performing step S103, the image capturing device 110 has the second focal length f2. When performing step S104, step S105, and step S106, the image capturing device 110 maintains the second focal length f2. When performing step S107, the focal length of the image capturing device 110 is adjusted from the second focal length f2 back to the first focal length f1.

The following provides a detailed description of step S101, step S102, step S103, step S104, step S105, step S106, and step S107.

Step S101: Capturing an image by the image capturing device.

Figure 4:
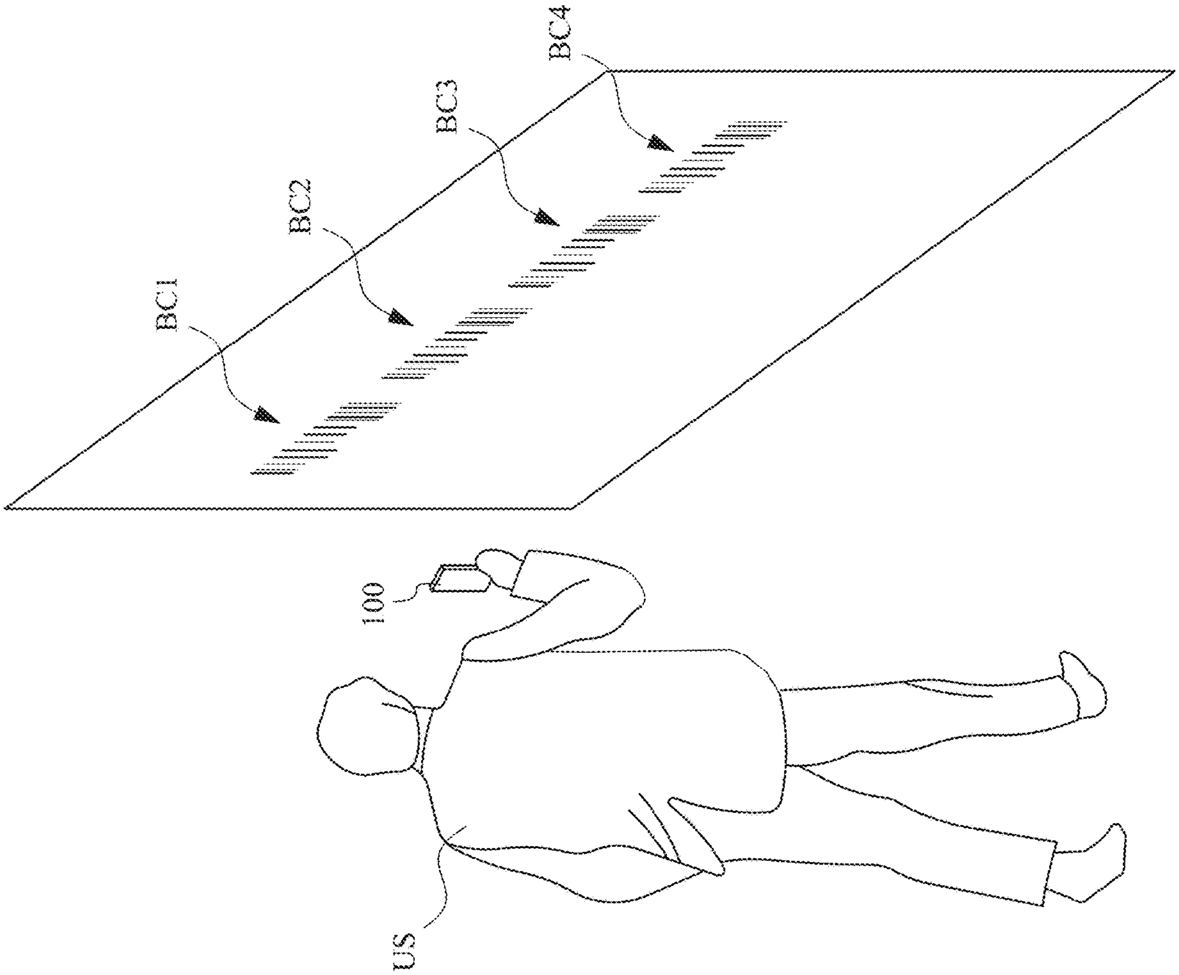
FIG. 4 is a schematic view of a user holding a barcode scanner to scan a plurality of barcodes in accordance with an embodiment of the present disclosure
Figure 5B:
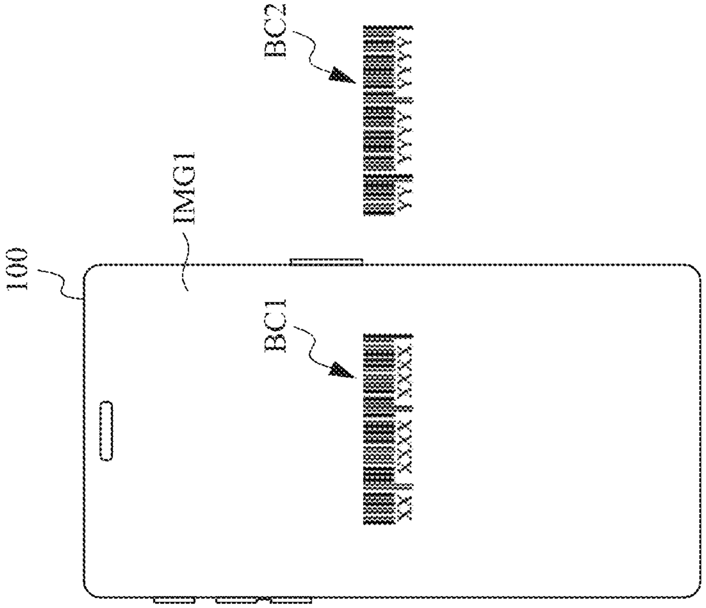
FIG. 5B is a schematic view of the barcode scanner focusing on the first image in accordance with an embodiment of the present disclosure.
Figure 5A:
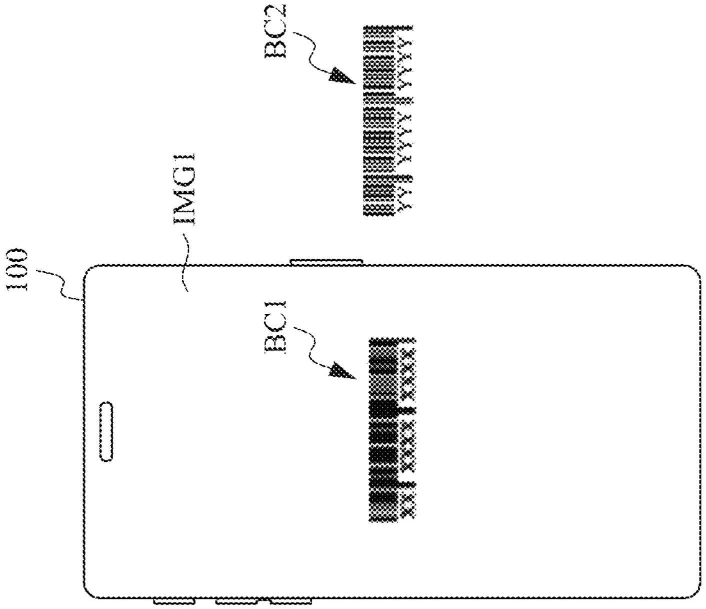
FIG. 5A is a schematic view of the barcode scanner focusing on a first image in accordance with an embodiment of the present disclosure.

Reference is made to FIG. 4 and FIG. 5A. FIG. 4 is a schematic view of a user holding a barcode scanner 100 to scan a plurality of barcodes in accordance with an embodiment of the present disclosure. FIG. 5A is a schematic view of the barcode scanner 100 focusing on a first image IMG1 in accordance with an embodiment of the present disclosure. As shown in FIG. 4, in this embodiment, the barcode scanner 100 may scan a first barcode BC1, a second barcode BC2, a third barcode BC3, and a fourth barcode BC4. More specifically, the processor 150 may control the image capturing device 110 to capture images of the first barcode BC1, the second barcode BC2, the third barcode BC3, and the fourth barcode BC4. As shown in FIG. 5A, the image capturing device 110 of the barcode scanner 100 captures the first image IMG1 including the first barcode BC1. In other words, the first image IMG1 includes the first barcode BC1, and the second barcode BC2 is outside the scope of the first image IMG1. As shown in FIG. 3 and FIG. 5A, in step S101, the image capturing device 110 has the first focal length f1, and the first image IMG1 including the first barcode BC1 is blurred. In other words, when the image capturing device 110 has the first focal length f1, the first image IMG1 including the first barcode BC1 is not in focus.

In a usage scenario, the first barcode BC1, the second barcode BC2, the third barcode BC3, and the fourth barcode BC4 are located on a horizontal plane (e.g., a wall surface). The user may hold the barcode scanner 100 to scan the first barcode BC1, the second barcode BC2, the third barcode BC3, and the fourth barcode BC4, and capture the images thereof.

Step S102: Adjusting the first focal length of the image capturing device to a second focal length.

Reference is made to FIG. 5B. FIG. 5B is a schematic view of the barcode scanner 100 focusing on the first image IMG1 in accordance with an embodiment of the present disclosure. As shown in FIG. 3 and FIG. 5B, in this embodiment, the focal length of the image capturing device 110 is adjusted from the first focal length f1 to the second focal length f2, in which the second focal length f2 is different from the first focal length f1. More specifically, the processor 150 controls the focusing device 130 to adjust the focal length of the image capturing device 110 from the first focal length f1 to the second focal length f2. As shown in FIG. 5B, in step S102, the focal length of the image capturing device 110 is adjusted from the first focal length f1 to the second focal length f2, so that the first image IMG1 including the first barcode BC1 becomes clear. In other words, when the image capturing device 110 has the second focal length f2, the first image IMG1 including the first barcode BC1 is in focus.

In some embodiments, adjusting the first focal length of the image capturing device to the second focal length (i.e., step S102) is performed after capturing the image by the image capturing device (i.e., step S101).

In a usage scenario, the image capturing device 110 of the barcode scanner 100 auto-focuses on the first image IMG1 including the first barcode BC1, and the focusing device 130 adjusts the focal length of the image capturing device 110 from the first focal length f1 to the second focal length f2. When the image capturing device 110 has the second focal length f2, the first barcode BC1 in the first image IMG1 appears clear.

Step S103: Scanning the barcode in the image.

Figure 6:
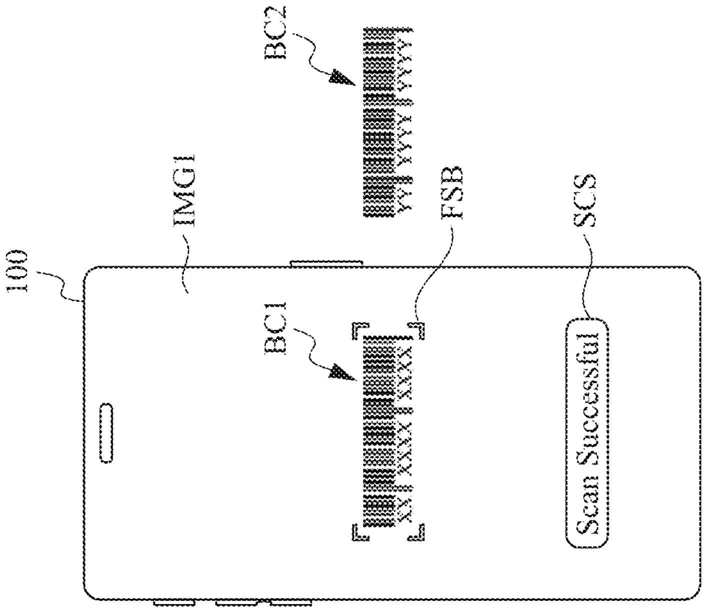
FIG. 6 is a schematic view of the barcode scanner scanning the first barcode in accordance with an embodiment of the present disclosure.

Reference is made to FIG. 6. FIG. 6 is a schematic view of the barcode scanner 100 scanning the first barcode BC1 in accordance with an embodiment of the present disclosure. As shown in FIG. 6, in this embodiment, the first barcode BC1 in the first image IMG1 is scanned. More specifically, the scanning module 120 of the barcode scanner 100 scans the first barcode BC1 in the first image IMG1. The scanning module 120 scans the first barcode BC1 in the first image IMG1 only after the first image IMG1 including the first barcode BC1 is focused. As shown in FIG. 3 and FIG. 6, the scanning of the first barcode BC1 in the first image IMG1 is performed by the image capturing device 110 having the second focal length f2. As shown in FIG. 6, in some embodiments, when the scanning module 120 scans the first barcode BC1, the user interface of the barcode scanner 100 displays an icon FSB and an icon SCS. In some embodiments, the icon FSB is displayed on the user interface of the barcode scanner 100 after the focusing device 130 completes focusing the first image IMG1 and the scanning module 120 scans the first barcode BC1. In some embodiments, when the scanning module 120 scans and recognizes the first barcode BC1, the icon SCS is displayed on the user interface of the barcode scanner 100.

In some embodiments, the icon FSB is displayed around the first barcode BC1. In some embodiments, the icon SCS may include content configured to inform to the user that the scanning of the first barcode BC1 has been completed. For example, the icon SCS may include textual content such as "Scan Successful". The present disclosure is not intended to be limited to the styles of the icon FSB and the icon SCS.

In some embodiments, the scanning module 120 may scan and recognize barcodes using, for example, the reflectivity of black lines and white lines of the barcode, optical character recognition (OCR), or a combination thereof. The present disclosure is not intended to be limited to the method used by the scanning module 120 to scan and recognize barcodes.

In some embodiments, scanning the barcode in the image (i.e., step S103) is performed after adjusting the first focal length of the image capturing device to the second focal length (i.e., step S102).

In a usage scenario, when the user holds the barcode scanner 100 to scan the first barcode BC1, the scanning module 120 scans and recognizes the first barcode BC1. Then, when the scanning module 120 completes the scanning of the first barcode BC1, the user interface of the barcode scanner 100 displays the icon FSB to inform the user that the scanning module 120 has scanned the first barcode BC1 in the first image IMG1. When the scanning module 120 completes scanning and recognizing the first barcode BC1, the user interface of the barcode scanner 100 displays the icon SCS to inform to the user US that the scanning and recognition of the first barcode BC1 in the first image IMG1 has been completed.

Step S104: Fixing the second focal length until a time interval is exceeded.

Figure 7B:
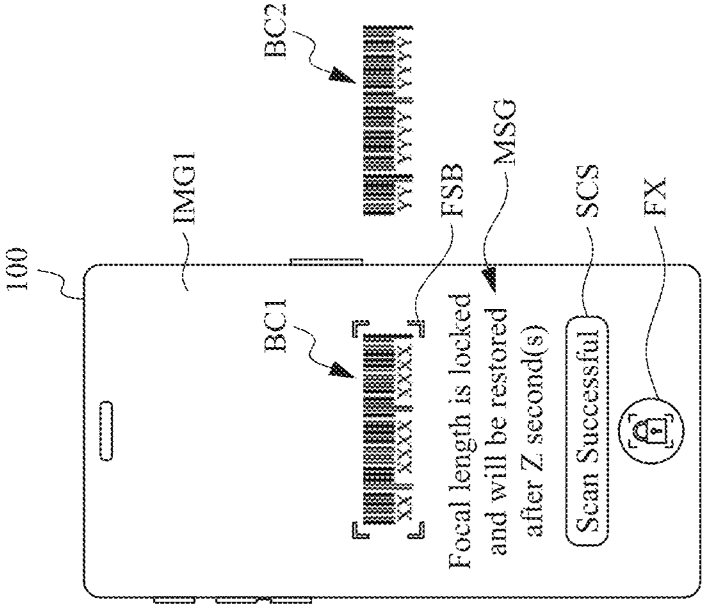
FIG. 7B is a schematic view of the focal length of the barcode scanner being locked in another embodiment of the present disclosure.
Figure 7A:
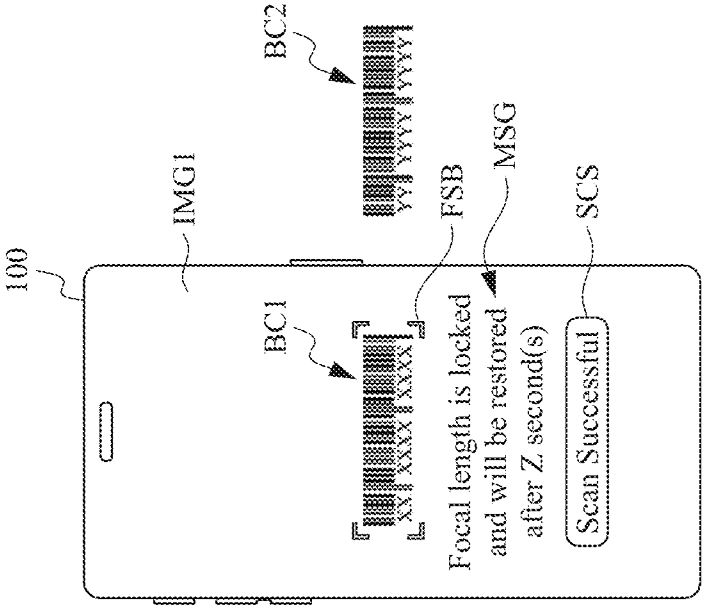
FIG. 7A is a schematic view of a focal length of the barcode scanner being locked in accordance with an embodiment of the present disclosure.

Reference is made to FIG. 7A and FIG. 7B. FIG. 7A is a schematic view of a focal length of the barcode scanner 100 being locked in accordance with an embodiment of the present disclosure. FIG. 7B is a schematic view of the focal length of the barcode scanner 100 being locked in another embodiment of the present disclosure. As shown in FIG. 3 and FIG. 7A, in this embodiment, the focal length of the image capturing device 110 is fixed at the second focal length f2. More specifically, the focal length of the image capturing device 110 is fixed at the second focal length f2 until the time interval ITV is exceeded. Specifically, after the scanning module 120 scans the first barcode BC1, the timer module 140 of the barcode scanner 100 sets the time interval ITV. Then, the processor 150 locks the focusing device 130 within the time interval ITV. When the focusing device 130 is locked, the focal length of the image capturing device 110 is fixed at the second focal length f2. In some embodiments, the processor 150 locks the focusing device 130 within the time interval ITV only after the focusing device 130 adjusts the focal length of the image capturing device 110 from the first focal length f1 to the second focal length f2. Then, after the scanning module 120 scans the first barcode BC1 in the first image IMG1, the processor 150 displays a countdown dynamic message MSG on the user interface of the barcode scanner 100, and the countdown dynamic message MSG is displayed within the time interval ITV.

In some embodiments, the countdown dynamic message MSG may include content configured to notify the user about the status of the timer module 140. For example, the countdown dynamic message MSG may include textual content such as "Focal length is locked and will be restored after Z second(s)". The value "Z" in the textual content of the countdown dynamic message MSG changes over time. The present disclosure is not intended to be limited to the style of the countdown dynamic message MSG.

In some other embodiments, as shown in FIG. 7B, after the focusing device 130 auto-focuses on the first image IMG1 and the scanning module 120 scans the first barcode BC1 in the first image IMG1, the processor 150 first displays an icon FX on the user interface of the barcode scanner 100. The icon FX is configured to lock the focusing device 130 of the barcode scanner 100. Specifically, the focusing device 130 is locked by the operation of a touch signal triggering the icon FX. After the icon FX is triggered by the touch signal, the processor 150 locks the focusing device 130 and displays the countdown dynamic message MSG on the user interface of the barcode scanner 100.

In some embodiments, fixing the second focal length until the time interval is exceeded (i.e., step S104) is performed after scanning the barcode in the image (i.e., step S103).

In a usage scenario, as shown in FIG. 7A, after the focusing device 130 auto-focuses on the first image IMG1 and the scanning module 120 scans the first barcode BC1 in the first image IMG1, the user interface of the barcode scanner 100 simultaneously displays the icon FSB, the icon SCS, and the countdown dynamic message MSG, and the focusing device 130 is thereby locked. In another use scenario, as shown in FIG. 7B, after the focusing device 130 auto-focuses on the first image IMG1 and the scanning module 120 scans the first barcode BC1 in the first image IMG1, the user interface of the barcode scanner 100 simultaneously displays the icon FSB, the icon SCS, and the icon FX. Then, the user taps the icon FX on the user interface to generate the touch signal that triggers the icon FX, and the focusing device 130 is locked as a result of the user triggering the icon FX.

Step S105: Capturing another image including another barcode different from the barcode by the image capturing device.

Figure 8:
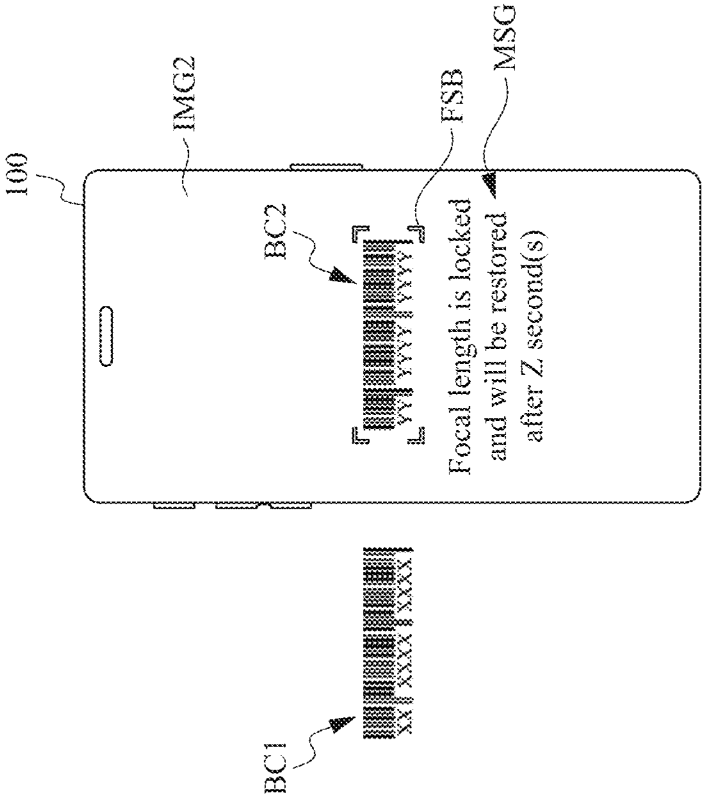
FIG. 8 is a schematic view of the barcode scanner focusing on a second image in accordance with an embodiment of the present disclosure.

Reference is made to FIG. 8. FIG. 8 is a schematic view of the barcode scanner 100 focusing on a second image IMG2 in accordance with an embodiment of the present disclosure. As shown in FIG. 8, in this embodiment, the barcode scanner 100 scans the second barcode BC2 after completing the scanning of the first barcode BC1. The image capturing device 110 of the barcode scanner 100 captures a second image IMG2 including the second barcode BC2. More specifically, the processor 150 may control the image capturing device 110 to capture the second image IMG2 including the second barcode BC2. In other words, the second image IMG2 includes the second barcode BC2, and the first barcode BC1 is outside the scope of the second image IMG2. As shown in FIG. 3 and FIG. 8, in step S105, the focal length of the image capturing device 110 remains at the second focal length f2, and the second image IMG2 including the second barcode BC2 appears clear. In other words, the second image IMG2 including the second barcode BC2 remains in focus. Since step S105 is performed within the time interval ITV, the focusing device 130 remains locked, and the image capturing device 110 retains the second focal length f2. As shown in FIG. 8, because step S105 is performed within the time interval ITV, the countdown dynamic message MSG remains displayed on the user interface of the barcode scanner 100.

In some embodiments, capturing another image including another barcode different from the barcode (i.e., step S105) is performed after fixing the second focal length until the time interval is exceeded (i.e., step S104).

In a usage scenario, after completing the scanning of the first barcode BC1, the user moves the barcode scanner 100 to the second barcode BC2 within the time interval ITV. Then, the image capturing device 110 captures the second image IMG2 including the second barcode BC2. As a result, when the user scans the second barcode BC2 immediately after scanning the first barcode BC1, the focusing device 130 does not need to re-focus on the second barcode BC2, allowing the scanning module 120 to recognize the second barcode BC2 rapidly.

Step S106: Scanning another barcode in another image.

Figure 9:
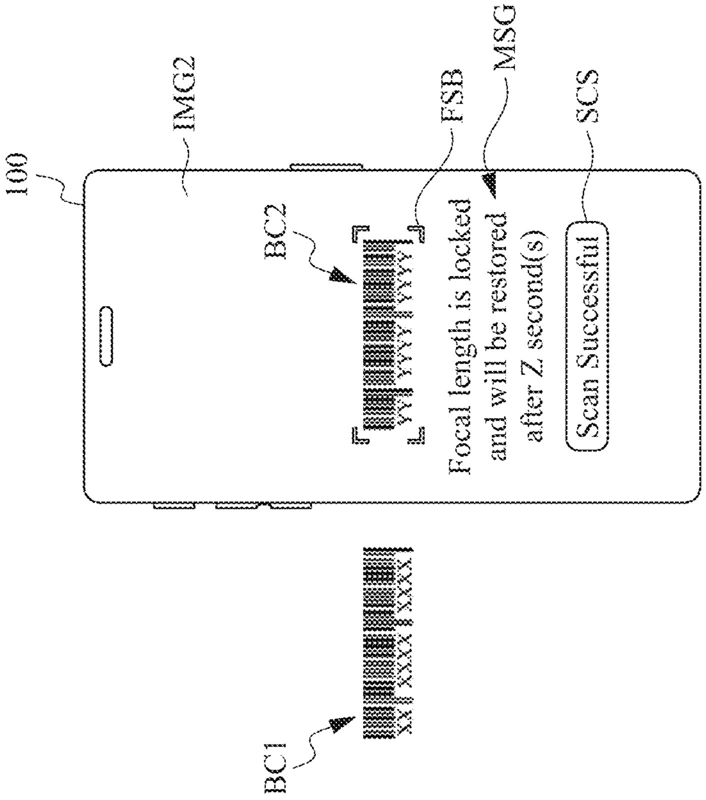
FIG. 9 is a schematic view of the barcode scanner scanning the second barcode in accordance with an embodiment of the present disclosure.

Reference is made to FIG. 9. FIG. 9 is a schematic view of the barcode scanner 100 scanning the second barcode BC2 in accordance with an embodiment of the present disclosure. As shown in FIG. 9, in this embodiment, the second barcode BC2 in the second image IMG2 is scanned. More specifically, the scanning module 120 of the barcode scanner 100 scans the second barcode BC2 in the second image IMG2. In practice, since step S106 is performed within the time interval ITV, the second image IMG2 including the second barcode BC2 can be scanned by the scanning module 120 without requiring refocusing. As shown in FIG. 3 and FIG. 9, the scanning module 120 scans the second barcode BC2 in the second image IMG2 by using the image capturing device 110 having the second focal length f2 within the time interval ITV. As shown in FIG. 9, in some embodiments, when the scanning module 120 scans the second barcode BC2, the user interface of the barcode scanner 100 displays the icon FSB and the icon SCS, and the countdown dynamic message MSG remains displayed. In some embodiments, when the focusing device 130 completes focusing the second image IMG2 and the scanning module 120 scans the second barcode BC2, the icon FSB is displayed on the user interface of the barcode scanner 100. In some embodiments, when the scanning module 120 scans and recognizes the second barcode BC2, the icon SCS is displayed on the user interface of the barcode scanner 100. In some embodiments, since step S106 is performed within the time interval ITV, the focusing device 130 remains locked, the image capturing device 110 retains the second focal length f2, and the processor 150 continues to display the countdown dynamic message MSG on the user interface of the barcode scanner 100.

In some embodiments, scanning another barcode in another image (i.e., step S106) is performed after capturing another image including another barcode different from the barcode (i.e., step S105).

In a usage scenario, when the user holds the barcode scanner 100 to scan the second barcode BC2, the scanning module 120 scans and recognizes the second barcode BC2. Then, when the scanning module 120 completes the scanning of the second barcode BC2, the icon FSB is displayed on the user interface of the barcode scanner 100 to inform the user that the scanning module 120 has scanned the second barcode BC2 in the second image IMG2. When the scanning module 120 completes scanning and recognizing the second barcode BC2, the icon SCS is displayed on the user interface of the barcode scanner 100 to inform the user that the scanning and recognizing of the second barcode BC2 in the second image IMG2 have been completed. Since step S106 is performed within the time interval ITV, the focusing device 130 remains locked, the image capturing device 110 continues to have the second focal length f2, and the processor 150 continues to display the countdown dynamic message MSG on the user interface of the barcode scanner 100.

Step S107: Controlling the image capturing device to auto-refocus the image after the time interval is exceeded.

Figure 10:
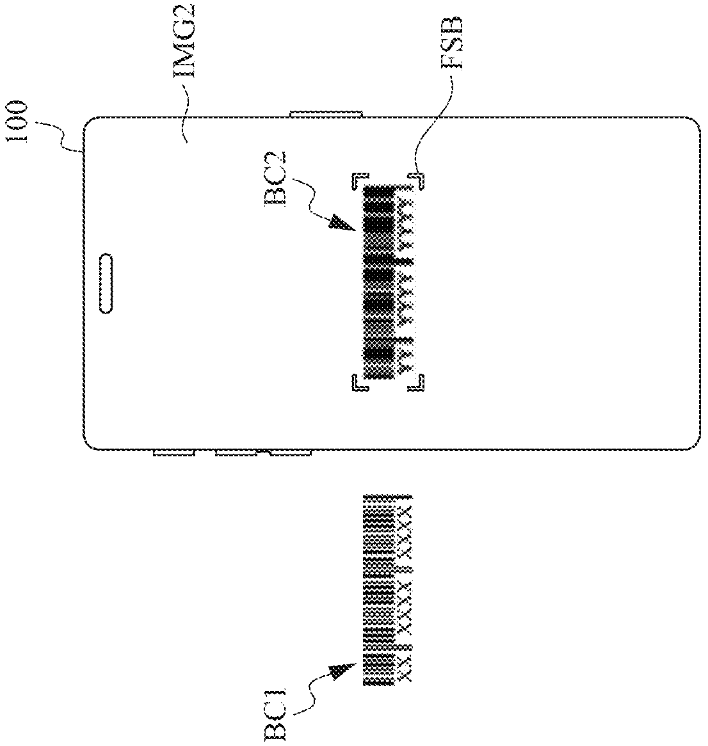
FIG. 10 is a schematic view of restoring the focal length of the second image in accordance with an embodiment of the present disclosure.

Reference is made to FIG. 10. FIG. 10 is a schematic view of restoring the focal length of the second image IMG2 in accordance with an embodiment of the present disclosure. As shown in FIG. 10, in this embodiment, after the time interval ITV is exceeded, the processor 150 controls the image capturing device 110 to auto-refocus the image. More specifically, after the time interval ITV is exceeded, the processor 150 controls the focusing device 130 to adjust the focal length of the image capturing device 110 from the second focal length f2 to any focal length different from the second focal length f2. As shown in FIG. 10, in step S107, the focal length of the image capturing device 110 is adjusted from the second focal length f2 to a focal length different from f2, making the second image IMG2 including the second barcode BC2 blurred. Alternatively, in some embodiments, after the time interval ITV is exceeded, the focal length of the image capturing device 110 is adjusted from the second focal length f2 to the first focal length f1. More specifically, after the time interval ITV is exceeded, the processor 150 controls the focusing device 130 to adjust the focal length of the image capturing device 110 from the second focal length f2 to the first focal length f1. As shown in FIG. 10, in step S107, the focal length of the image capturing device 110 is adjusted from the second focal length f2 to the first focal length f1, causing the second image IMG2 including the second barcode BC2 to become blurred. In other words, when the image capturing device 110 has the first focal length f1, the second image IMG2 including the second barcode BC2 is not in focus. As shown in FIG. 10, since step S107 is performed after the time interval ITV is exceeded, the countdown dynamic message MSG disappears from the user interface of the barcode scanner 100.

In some embodiments, the time interval ITV may be approximately one second. In other embodiments, the time interval ITV may be approximately two seconds, three seconds, or longer.

In some embodiments, controlling the image capturing device to auto-refocus the image after the time interval is exceeded (i.e., step S107) is performed after scanning another barcode in another image (i.e., step S106).

In a usage scenario, after the time interval ITV is exceeded, the focusing device 130 adjusts the focal length of the image capturing device 110 from the second focal length f2 to a focal length different from the second focal length f2. When the image capturing device 110 has a focal length other than the second focal length f2, the second barcode BC2 in the second image IMG2 becomes blurred. In this situation, if the user intends to continue scanning the third barcode BC3 and/or the fourth barcode BC4 using the barcode scanner 100, the focusing device 130 must re-focus, and the timer module 140 must set a new time interval ITV in order to quickly complete the operation of scanning the third barcode BC3 and/or the fourth barcode BC4.

It should be noted that the above description of the method M is provided using only the first barcode BC1 and the second barcode BC2 for illustrative purposes. However, this does not mean that the method M is limited to scanning only two barcodes within the time interval ITV. For example, if the first barcode BC1, the second barcode BC2, the third barcode BC3, and the fourth barcode BC4 are all scanned within the time interval ITV, the first barcode BC1, the second barcode BC2, the third barcode BC3, and the fourth barcode BC4 can be quickly scanned without requiring auto-refocus.

By performing the method M as shown in FIG. 1 of the present disclosure, the time required by the barcode scanner 100 to scan multiple barcodes can be effectively reduced.

From the above detailed description of the specific embodiments of the present disclosure, it can be clearly seen that in the barcode scanner and the method of operating the same of the present disclosure, since the focusing device can adjust the focal length of the image capturing device to the first focal length or the second focal length, the user can hold the barcode scanner and perform auto-focus on different barcodes located at different distances. In the barcode scanner and the method of operating the same of the present disclosure, since the focusing device can perform auto-focus on a barcode and the focusing device can be controlled by the processor to fix the focal length of the image capturing device, the user can hold the barcode scanner and perform continuous scanning of different barcodes located at the same distance. In the barcode scanner and the method of operating the same of the present disclosure, since the timer module can set a time interval after the scanning module scans a barcode, and the processor can control the focusing device to fix the focal length of the image capturing device until the time interval is exceeded, the user can perform continuous scanning of different barcodes located at the same distance within the time interval, thereby saving the time otherwise required for the focusing device to focus on each individual barcode. In the barcode scanner and the method of operating the same of the present disclosure, since the processor controls the image capturing device to auto-refocus the image after the time interval is exceeded, the service life of the focusing device can be extended. Overall, the operating method of the barcode scanner of the present disclosure saves the time required by the focusing device to focus on different barcodes.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of the present disclosure provided they fall within the scope of the following claims.

What is claimed is:

1. A method of operating a barcode scanner, comprising:

capturing an image by an image capturing device, the image comprising a barcode, and the image capturing device having a first focal length, wherein the image capturing device is configured to auto-focus on the image;

adjusting the first focal length of the image capturing device to a second focal length different from the first focal length;

scanning the barcode in the image;

displaying an icon of a focusing device configured to lock the barcode scanner on a user interface of the barcode scanner after the image capturing device auto-focuses on the image; and fixing the second focal length until a time interval is exceeded.

2. The method of claim 1, further comprising:

controlling the image capturing device to auto-refocus the image after the time interval is exceeded.

3. The method of claim 1, further comprising:

capturing a second image comprising a second barcode different from the barcode by the image capturing device, wherein the image capturing device has the second focal length; and scanning the second barcode in the second image.

4. The method of claim 3, wherein scanning the second barcode in the second image comprises scanning the second barcode in the second image by the image capturing device having the second focal length within the time interval.

5. The method of claim 1, wherein scanning the barcode in the image is performed by the barcode scanner having the second focal length.

6. The method of claim 1, further comprising:

displaying a countdown dynamic message on the user interface of the barcode scanner, and the countdown dynamic message being displayed with the time interval.

7. A method of operating a barcode scanner, comprising:

capturing an image by an image capturing device, the image comprising a barcode, and the image capturing device having a first focal length;

adjusting the first focal length of the image capturing device to a second focal length different from the first focal length;

scanning the barcode in the image;

fixing the second focal length until a time interval is exceeded; and displaying a countdown dynamic message on a user interface of the barcode scanner, and the countdown dynamic message being displayed with the time interval.

8. The method of claim 7, further comprising:

locking a focusing device of the barcode scanner within the time interval after adjusting the first focal length of the image capturing device to the second focal length.

9. The method of claim 7, further comprising:

displaying an icon of a focusing device configured to lock the barcode scanner on the user interface of the barcode scanner after adjusting the first focal length of the image capturing device to the second focal length.

10. The method of claim 7, further comprising:

controlling the image capturing device to auto-refocus the image after the time interval is exceeded.

11. The method of claim 7, further comprising:

capturing a second image comprising a second barcode different from the barcode by the image capturing device, wherein the image capturing device has the second focal length; and scanning the second barcode in the second image.

12. The method of claim 11, wherein scanning the second barcode in the second image comprises scanning the second barcode in the second image by the image capturing device having the second focal length within the time interval.

13. The method of claim 7, wherein scanning the barcode in the image is performed by the barcode scanner having the second focal length.

14. The method of claim 7, wherein the image capturing device is configured to auto-focus on the image.

15. A barcode scanner, comprising:

an image capturing device configured to capture an image;

a scanning module configured to scan a plurality of barcodes in the image;

a focusing device configured to adjust the image capturing device to have a first focal length and a second focal length different from the first focal length;

a timer module configured to set a time interval after the scanning module scans one of the plurality of barcodes; and a processor electrically or communicatively connected to the image capturing device, the scanning module, the focusing device, and the timer module, and the processor being configured to:

control the focusing device to adjust the first focal length of the image capturing device to the second focal length;

control the scanning module to scan the one of the plurality of barcodes as the image capturing device has the second focal length;

display an icon of the focusing device configured to lock the barcode scanner on a user interface of the barcode scanner after the focusing device adjusts the first focal length of the image capturing device to the second focal length; and control the focusing device to fix the second focal length until the time interval is exceeded after the scanning module scans the one of the plurality of barcodes.

16. The barcode scanner of claim 15, wherein the processor is further configured to:

control the image capturing device to auto-refocus the image after the time interval is exceeded.

17. The barcode scanner of claim 15, wherein the processor is further configured to:

control the image capturing device to capture a second image comprising a second one of the plurality of barcodes, and the image capturing device having the second focal length.

18. The barcode scanner of claim 17, wherein the processor is further configured to:

scan the second one of the plurality of barcodes in the second image within the time interval.

19. The barcode scanner of claim 15, wherein the focusing device is locked by a touching signal of a user triggering the icon.

20. The barcode scanner of claim 15, wherein the processor is further configured to:

display a countdown dynamic message on the user interface of the barcode scanner, and the countdown dynamic message being displayed with the time interval.

* * * * *